(No Model.)

M. O'CONNOR.
MOLDING DEVICE.

No. 396,831. Patented Jan. 29, 1889.

Witnesses.
A. Ruppert,
G. B. Towles.

Inventor:
Michael O'Connor,
Per
Thomas P. Simpson
atty

UNITED STATES PATENT OFFICE.

MICHAEL O'CONNOR, OF SOUTH PITTSBURG, TENNESSEE.

MOLDING DEVICE.

SPECIFICATION forming part of Letters Patent No. 396,831, dated January 29, 1889.

Application filed August 16, 1888. Serial No. 282,938. (No model.)

*To all whom it may concern:*

Be it known that I, MICHAEL O'CONNOR, a citizen of the United States, residing at South Pittsburg, in the county of Marion and State of Tennessee, have invented certain new and useful Improvements in Molding Devices; and I do declare the following to be a full, clear, and exact description of the invention, such as will enable others skilled in the art to which it appertains to make and use the same, reference being had to the accompanying drawings, and to the letters and figures of reference marked thereon, which form a part of this specification.

This invention relates to a pattern for light or heavy castings which are to have apertures made in them—such as lugs on some parts of stoves, &c.—the object of the invention being to provide a molding device by which the mold may be so formed of sand that the part of the casting which is to be perforated will be cast with an aperture in it.

In the accompanying drawings my invention is shown in the form of a lug extending from a pattern-plate.

Figure 1:
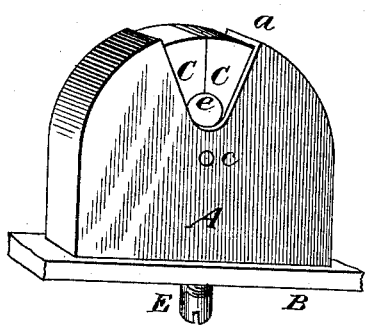
Figure 2:
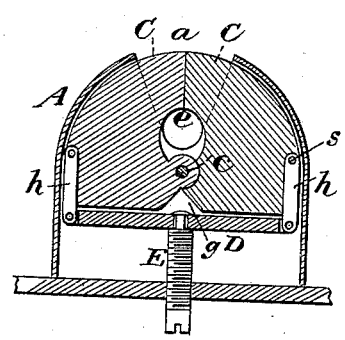
Figure 3:
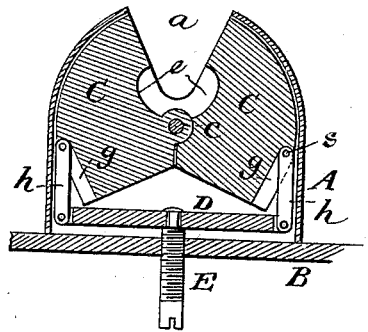

Figure 1 is a perspective view of the device. Fig. 2 is a vertical central section of the same. Fig. 3 illustrates the operation of the device.

A designates a casing projecting from a plate, B, the outer part of the casing being semicircular in form and having a segmental portion cut out to form an opening, *a*, which extends toward the center, narrowing inward, as shown. Within the casing A are placed two jaws, C, which are pivoted together and to the casing at *c*. The said jaws when closed fit in the semicircular part of the casing, leaving sufficient space between the plate B and the base of the jaws to allow their opening movement, as hereinafter set forth. A concavity, *e*, is formed in the inner edge of each jaw C, an aperture being thus formed between the jaws when they are closed, such aperture being in line with the inner end of the opening *a* in the casing, so that a hole is formed directly through the pattern-lug, in which molding-sand may be pressed and a core formed therein. The inner corners of the jaws just rearward of the pivot *c* are cut away, as shown at *g*, to allow the jaws to open.

D indicates a bar which extends along the base of the jaws C, the ends of said bar being connected by the links or connecting-pieces *h* with the outer edges of the jaws at points (indicated by *s*) somewhat removed from the base of the jaws. A screw, E, passes through a threaded aperture in plate B, and has its inner end swiveled to the bar D at the center. By turning the said screw in one direction the bar D is drawn backward and the jaws are caused to turn on their pivot and open, and by turning the screw in the opposite direction the bar is pressed forward and the jaws are closed. The jaws being closed the sand is packed about the lug-pattern in the usual manner to form a mold, the aperture through the lug, as above described, being filled. The screw E is then turned to draw backward the bar D, which causes the jaws to open, when the lug-pattern may be withdrawn, leaving the core which is to form the aperture in the casting intact.

I claim—

1. In a molding device, a casing provided with an opening extending inward from its outer edge, substantially as shown, two jaws pivoted within the casing and constructed to form an aperture between them in line with the opening in the casing, and suitable means for opening said jaws, substantially as and for the purposes described.

2. The combination, with a casing, A, provided with an opening, *a*, and the plate B, having an aperture with a threaded wall, of the pivoted jaws C, having concavities *e*, bar D, connecting-pieces *h*, and screw E, substantially as set forth and described.

In testimony whereof I affix my signature in presence of two witnesses.

MICHAEL O'CONNOR.

Witnesses:
MAURICE B. SHEA,
W. E. HUDSON, Jr.